(12) United States Patent
Yount et al.

(10) Patent No.: US 7,718,137 B2
(45) Date of Patent: May 18, 2010

(54) REACTOR WITH OPTIMIZED INTERNAL TRAY DESIGN

(75) Inventors: Thomas Lloyd Yount, Kingsport, TN (US); Larry Cates Windes, Kingsport, TN (US); Bruce Roger DeBruin, Lexington, SC (US)

(73) Assignee: Eastman Chemical Company, Kingsport, TN (US)

( * ) Notice: Subject to any disclaimer, the term of this patent is extended or adjusted under 35 U.S.C. 154(b) by 479 days.

(21) Appl. No.: 11/496,835

(22) Filed: Aug. 1, 2006

(65) Prior Publication Data

US 2007/0100094 A1    May 3, 2007

Related U.S. Application Data

(60) Provisional application No. 60/731,390, filed on Oct. 28, 2005.

(51) Int. Cl.
*B01J 19/00*     (2006.01)
*B01J 19/18*     (2006.01)
*B01J 10/00*     (2006.01)

(52) U.S. Cl. .................. 422/131; 422/134; 422/136; 422/191; 422/228

(58) Field of Classification Search .................. 422/131, 422/134, 136, 191, 228
See application file for complete search history.

(56) References Cited

U.S. PATENT DOCUMENTS

| | | |
|---|---|---|
| 1,804,554 A | 5/1931 | Dubbs |
| 3,017,950 A | 1/1962 | Koshoot |
| 3,250,747 A | 5/1966 | Mitchell et al. |
| 3,841,836 A | 10/1974 | Lunsford et al. |
| 4,196,168 A | 4/1980 | Lewis |
| 4,289,895 A | 9/1981 | Burkhardt et al. |
| 4,308,107 A | 12/1981 | Markfort |
| 4,361,538 A | 11/1982 | Dicoi et al. |
| 4,543,219 A | 9/1985 | Yamato et al. |
| 4,568,258 A | 2/1986 | Henderson |
| 4,582,569 A | 4/1986 | Jenkins |
| 4,604,261 A | 8/1986 | Chen et al. |
| 4,615,770 A | 10/1986 | Govind |
| 4,657,638 A | 4/1987 | Le Grand et al. |
| 4,753,779 A | 6/1988 | Harris et al. |
| 4,832,915 A | 5/1989 | Messura et al. |
| 4,851,198 A | 7/1989 | Lohrberg |
| 4,937,051 A | 6/1990 | Graven et al. |
| 4,952,375 A | 8/1990 | Zardi |
| 4,988,486 A | 1/1991 | Harris et al. |
| 5,013,407 A | 5/1991 | Nocca et al. |

(Continued)

*Primary Examiner*—Walter D Griffin
*Assistant Examiner*—Lessanework Seifu
(74) *Attorney, Agent, or Firm*—Dennis V. Carmen; Bernard J. Graves, Jr.

(57) ABSTRACT

A system for processing large quantities of a reaction medium while maintaining the reaction medium in sheets. The system includes a reactor having a plurality of vertically-spaced downwardly-sloped trays over which the reaction medium flows while it is subjected to reaction conditions. The slope of the trays increases downwardly to accommodate for the increased viscosity of the reaction medium while the reaction medium flows downwardly through the reactor. An upper portion of the trays have a uni-directional configuration, while a lower portion of the trays have a bi-directional configuration. Further, the orientation of flow across the uni-directional trays is rotated by 90 degrees in at least one location as the reaction medium flows down the uni-directional trays.

27 Claims, 7 Drawing Sheets

U.S. PATENT DOCUMENTS

| | | |
|---|---|---|
| 5,091,060 A | 2/1992 | Walker et al. |
| 5,130,102 A | 7/1992 | Jones, Jr. |
| 5,133,942 A | 7/1992 | Jones |
| 5,230,839 A | 7/1993 | Sampath et al. |
| 5,277,847 A | 1/1994 | Gentry et al. |
| 5,308,592 A | 5/1994 | Yang et al. |
| 5,310,955 A | 5/1994 | Shirtum et al. |
| 5,338,517 A | 8/1994 | Evans, III et al. |
| 5,372,790 A | 12/1994 | Shirtum et al. |
| 5,389,343 A | 2/1995 | Gentry |
| 5,464,590 A | 11/1995 | Yount et al. |
| 5,466,419 A | 11/1995 | Yount et al. |
| 5,523,061 A | 6/1996 | Hao et al. |
| 5,531,884 A | 7/1996 | Johnson et al. |
| 5,593,548 A | 1/1997 | Yeoman et al. |
| 5,601,797 A | 2/1997 | Gentry |
| 5,709,780 A | 1/1998 | Ognisty et al. |
| 5,779,993 A | 7/1998 | Gentry |
| 5,786,443 A | 7/1998 | Lowe |
| 6,010,667 A | 1/2000 | Meyer et al. |
| 6,076,813 A | 6/2000 | Yeoman et al. |
| 6,197,264 B1 | 3/2001 | Korhonen et al. |
| 6,224,043 B1 | 5/2001 | Fan et al. |
| 6,287,367 B1 | 9/2001 | Buchanan et al. |
| 6,299,146 B1 | 10/2001 | Yu et al. |
| 6,458,916 B1 | 10/2002 | Yamaguchi et al. |
| 6,461,574 B2 | 10/2002 | Korhonen et al. |
| 6,527,258 B2 | 3/2003 | Bartlok |
| 6,588,736 B1 | 7/2003 | Chuang et al. |
| 6,722,639 B2 | 4/2004 | Ender et al. |
| 6,734,282 B1 | 5/2004 | Wagener et al. |
| 6,825,311 B2 | 11/2004 | Balduff et al. |
| 2003/0147790 A1 | 8/2003 | Kawano et al. |
| 2003/0223917 A1 | 12/2003 | Yang et al. |
| 2004/0141892 A1 | 7/2004 | Van Hasselt et al. |
| 2004/0192878 A1 | 9/2004 | Borer et al. |
| 2005/0163679 A1 | 7/2005 | Schulz Van Endert et al. |

REACTOR WITH OPTIMIZED INTERNAL TRAY DESIGN

CROSS-REFERENCE TO RELATED APPLICATIONS

This application claims priority to U.S. Provisional Application Ser. No. 60/731,390, filed on Oct. 28, 2005, the disclosure of which is incorporated herein by reference in its entirety.

FIELD OF THE INVENTION

The present invention relates generally to a reactor for processing a reaction medium having a viscosity that increases as the medium flows through the reactor. In another aspect, the present invention concerns a polymerization reactor having a plurality of vertically-spaced internal trays over which a polymerization reaction medium flows while the degree of polymerization of the reaction medium is increased.

BACKGROUND OF THE INVENTION

In certain chemical processing schemes, it is desirable for chemical reactions to take place in a reaction medium flowing in one or more relatively thin sheets. In such a processing scheme, the reaction progresses over an extended period of time while the sheets of reaction medium are exposed to the requisite reaction conditions. This type of process is particularly advantageous where the chemical reaction produces a gaseous reaction by-product, and it is desirable to rapidly and completely disengage such by-product from the reaction medium. For example, if the chemical reaction producing the gaseous by-product is reversible, failure to adequately disengage the by-product could counteract the desired reaction. When the reaction medium flows in one or more relatively thin sheets, the gaseous reaction by-product can rapidly escape the reaction medium. Further, when the reaction medium flows in one or more relatively thin sheets, the low hydrostatic pressure on the bottom portion of the reaction medium minimizes boiling suppression that can be exhibited when reactions are executed using relatively deep reaction mediums.

Although carrying out chemical reactions in relatively thin sheets of a reaction medium has a number of advantages, this type of process also presents a number of challenges. For example, because thin sheets of reaction medium require large amounts of surface area on which to flow, very large and/or numerous reactors may be required to produce commercial quantities of the reaction product. Further, in many processes employing thin sheets of reaction medium, the viscosity of the reaction medium changes as the reaction progresses. Thus, the viscosity of the final product may be much greater or much less than the viscosity of the initial reaction medium. This changing viscosity of the reaction medium presents a number of design challenges because significant variations in the flow rate and/or depth of the reaction medium can be undesirable.

One example of a common commercial process where it is desirable to carry out a chemical reaction in one or more relatively thin sheets of reaction medium is in the "finishing" stage of polyethylene terephthalate (PET) production. During the PET finishing stage, polycondensation causes the degree of polymerization of the reaction medium to increase significantly and also produces ethylene glycol, acetaldehyde, and water as reaction by-products. Typically, the degree of polymerization of the reaction medium introduced into the finishing reactor/zone is 20-60 while the degree of polymerization of the reaction medium/product exiting the finishing reaction is 80-200. This increase in the degree of polymerization of the reaction medium during finishing causes the viscosity of the reaction medium to increase significantly. In addition, since the polycondensation reaction associated with PET finishing is reversible, it is desirable to disengage the ethylene glycol reaction by-product from the reaction medium as quickly and completely as possible.

Thus, there exists a need for a more efficient and economical reactor that facilitates the processing of large quantities of a reaction medium in relatively thin sheets for extended periods of time. Further, there exists a need for a more efficient and effective PET finishing reactor that facilitates the polycondensation of large quantities of reaction medium flowing in relatively uniform, thin sheets through the finishing reactor, while providing adequate residence time to achieve the requisite degree of polymerization.

SUMMARY OF THE INVENTION

In accordance with one embodiment of the present invention, there is provided a reactor comprising a plurality of vertically-spaced uni-directional sloped trays and a plurality of vertically-spaced bi-directional sloped trays, where the slope of the uni-directional trays increases downwardly.

In accordance with another embodiment of the present invention, there is provided a reactor for processing a reaction medium. The reactor comprises a plurality of vertically-spaced sloped trays. At least some of the trays include an upwardly-extending weir over which at least a portion of the reaction medium flows in order to pass to the next tray located immediately therebelow.

In accordance with still another embodiment of the present invention, there is provided a polymerization process comprising: (a) introducing a reaction medium into a polymerization reactor comprising a plurality of vertically-spaced sloped trays; (b) causing the reaction medium to flow downwardly in the polymerization reactor over the vertically-spaced trays, wherein the average thickness of the reaction medium flowing on the vertically-spaced trays is maintained at about 2.5 inches or more; and (c) withdrawing the reaction medium from the polymerization reactor, wherein the degree of polymerization of the reaction medium withdrawn from the polymerization reactor is at least about 25 percent greater than the degree of polymerization of the reaction medium introduced into the polymerization reactor.

In accordance with yet another embodiment of the present invention, there is provided a process comprising: (a) introducing a reaction medium into an upper section of a reactor comprising a plurality of uni-directional sloped trays and a plurality of bi-directional sloped trays; (b) causing the reaction medium to flow downwardly in the reactor over the uni-directional and bi-directional trays; and (c) withdrawing the reaction medium from a lower section of the reactor.

BRIEF DESCRIPTION OF THE DRAWING FIGURES

FIG. 2a is a sectional top view of the reactor taken along line 2a-2a in FIG. 1, particularly illustrating the length-wise direction of flow of the reaction medium on the top uni-directional tray.

FIG. 2b is a sectional top view of the reactor taken along line 2b-2b in FIG. 1, particularly illustrating the length-wise direction of flow of the reaction medium on the uni-directional tray located just below the tray shown in FIG. 2a.

FIG. 3a is a sectional top view of the reactor taken along line 3a-3a in FIG. 1, particularly illustrating the width-wise direction of flow of the reaction medium on a uni-directional tray located below the length-wise trays illustrated in FIGS. 2a and 2b.

FIG. 3b is a sectional top view of the reactor taken along line 3b-3b in FIG. 1, particularly illustrating the width-wise direction of flow of the reaction medium on the uni-directional tray located just below the tray shown in FIG. 3a.

FIG. 4a is a sectional top view of the reactor of taken along line 4a-4a in FIG. 1, particularly illustrating the directional of flow of the reaction medium on a downwardly-diverging bi-directional roof tray located below the uni-directional trays.

FIG. 4b is a sectional top view of the reactor of taken along line 4b-4b in FIG. 1, particularly illustrating the direction of flow of the reaction medium on a downwardly-converging bi-directional trough tray located just below the roof tray shown in FIG. 4a.

FIG. 5a is an enlarged front view of the pair of length-wise uni-directional trays circumscribed with phantom lines and labeled "5" in FIG. 1.

FIG. 5b is a side view of the length-wise uni-directional trays shown in FIG. 5a.

FIG. 6a is an enlarged front view of the pair of width-wise uni-directional trays circumscribed with phantom lines and labeled "6" in FIG. 1.

FIG. 6b is a side view of the width-wise uni-directional trays shown in FIG. 6a.

FIG. 7a is an enlarged front view of the pair of bi-directional trays circumscribed with phantom lines and labeled "7" in FIG. 1.

FIG. 7b is a side view of the bi-directional trays shown in FIG. 7a.

FIG. 8b is a top view of the transition assembly shown in FIG. 8a.

DETAILED DESCRIPTION OF THE INVENTION

Figure 1:
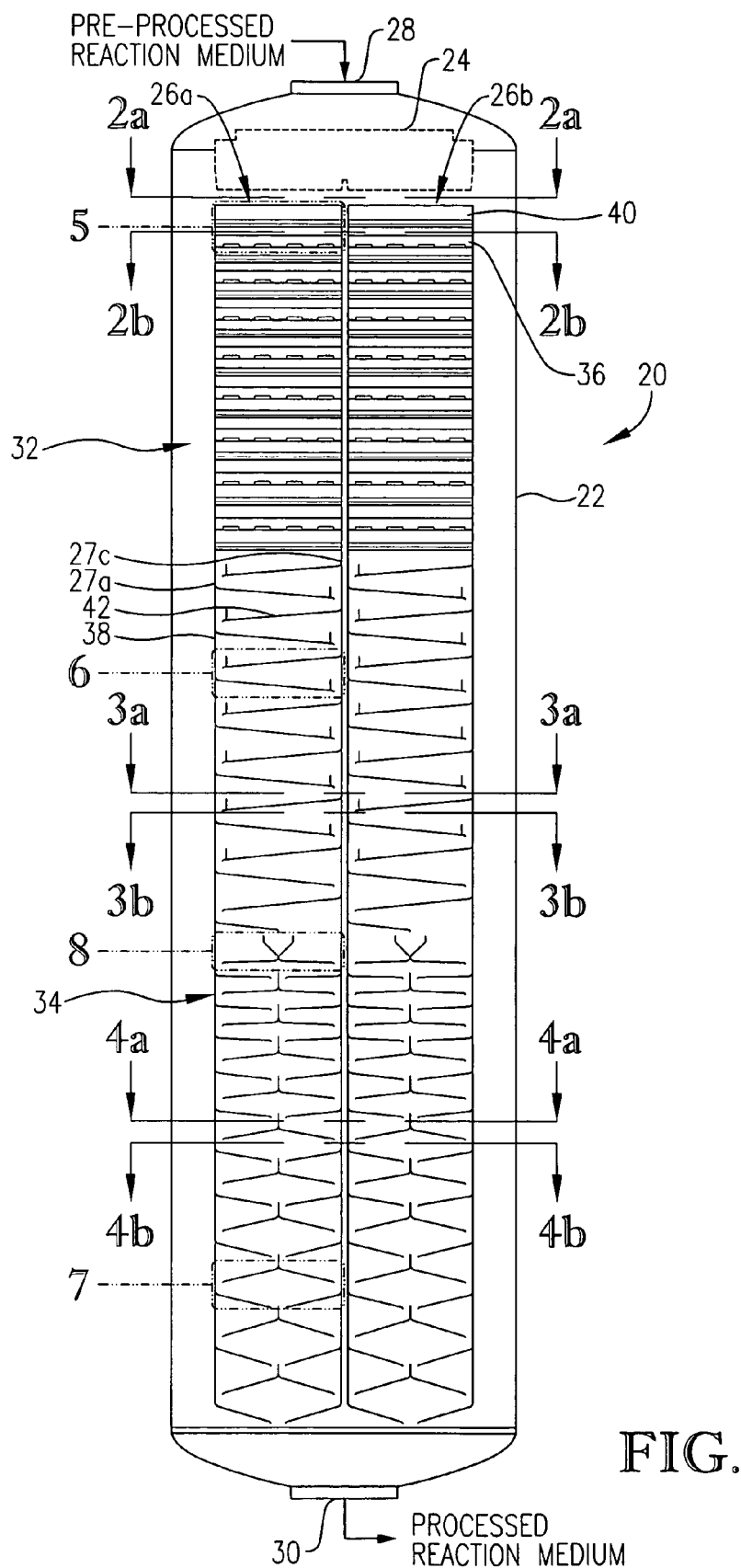
FIG. 1 is a sectional front view of a reactor for processing a reaction medium flowing downwardly therethrough, particularly illustrating the reactor as including two tray boxes which each house a plurality of vertically-spaced sloped internal trays over which the reaction medium flows as it passes downwardly through the reactor.

Referring initially to FIG. 1, a reactor 20 is illustrated as comprising a vessel shell 22, a distributor 24, and two tray boxes 26a,b. Vessel shell 22 preferably has an elongated, generally cylindrical configuration. The length-to-diameter (L:D) ratio of vessel shell 22 is preferably at least about 1:1, more preferably in the range of from about 2:1 to about 30:1, and most preferably in the range of from 3:1 to 10:1. During normal operation of reactor 20, vessel shell 22 is maintained in a substantially vertical position.

Vessel shell 22 defines an upper inlet 28 and a lower outlet 30. Distributor 24 and tray boxes 26a,b are vertically positioned between inlet 28 and outlet 30 so that reaction medium entering reactor 20 via inlet 28 can flow downwardly through distributor 24 and tray boxes 26a,b before being discharged from reactor 20 via outlet 30.

When reactor 20 includes a plurality of tray boxes 26a,b, distributor 24 is used to divide and distribute the flow of the incoming reaction medium so that each tray box 26a,b receives and processes substantially the same amount of the reaction medium. If reactor 20 were to employ only one tray box, then the distributor would not divide the flow of the reaction medium, but would still act to properly distribute the reaction medium into the inlet of the tray box.

In the embodiment illustrated in FIGS. 1-8, reactor 20 includes two substantially identical tray boxes 26a,b. The following section will describe the configuration of only one tray box 26a with the understanding that all the tray boxes 26a,b have substantially the same configuration.

Figures 2A, 2B:
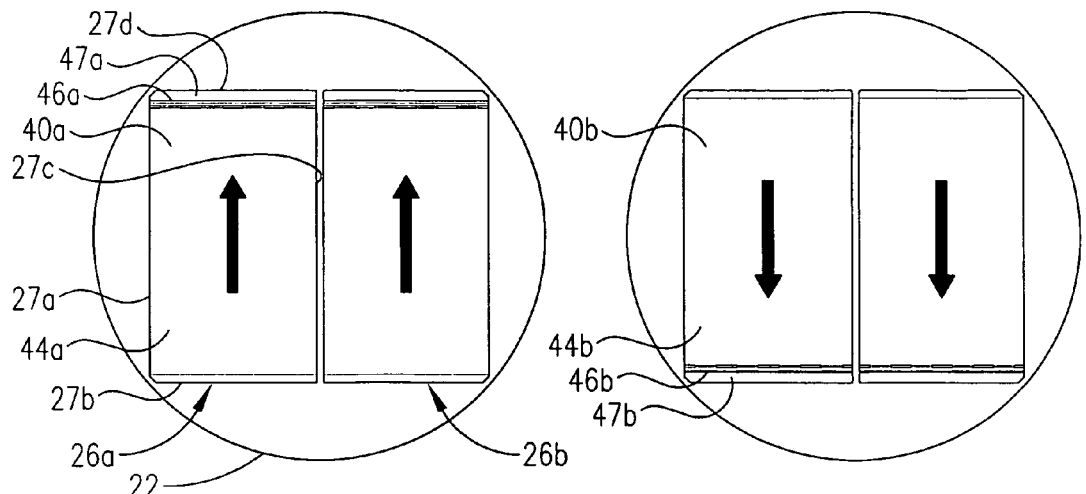

Referring to FIGS. 1 and 2a, tray box 26a includes a plurality of upright sidewalls 27a,b,c,d which define a generally rectangular internal space. Tray box 26a also includes a plurality of vertically-spaced sloped trays received in the internal space and rigidly coupled to sidewalls 27a,b,c,d. The internal space defined by sidewalls 27a,b,c,d is open at the top and bottom so that the reaction medium can enter the top of tray box 26a, flow downwardly through the internal space over the sloped trays, and exit the bottom of tray box 26a. Preferably, tray box 26a includes at least about 10 trays, more preferably at least about 20 trays, and most preferably in the range of from 30 to 100 trays. Of course, the preferred total number of trays in the reactor 20 is simply the number of trays in one tray box times the number of tray boxes in the reactor 20. The slope of the trays generally increases downwardly in reactor 20 to accommodate the increasing viscosity of the reaction medium as it flows downwardly over the trays.

Referring again to FIG. 1, it is preferred for tray box 26a to include trays with different configurations and/or orientations to optimize flow of the reaction medium therethrough. Preferably, tray box 26a includes a plurality of uni-directional trays 32 and a plurality of bi-directional trays 34. As used herein, the term "uni-directional tray" means a tray that slopes in only one direction so that fluid flowing in the tray box at the elevation of that tray flows only in one direction. As used herein, the term "bi-directional tray" means a tray that slopes in two directions so that fluid flowing in the tray box at the elevation of that tray flows in two directions. In a preferred embodiment of the present invention, at least a portion of the uni-directional trays 32 are located above at least a portion of the bi-directional trays 34. Most preferably, all of the uni-directional trays 32 are located above all of the bi-directional trays 34. Preferably, tray box 26a includes at least about 5 uni-directional trays, more preferably at least about 10 uni-directional trays, and most preferably in the range of from 15 to 50 uni-directional trays. Preferably, tray box 26a includes at least about 5 bi-directional trays, more preferably at least about 10 bi-directional trays, and most preferably in the range of from 15 to 50 bi-directional trays. Preferably, at least about 10 percent of all of the trays in tray box 26a are uni-directional trays, more preferably at least about 20 percent are uni-directional trays, and most preferably in the range of from 30 percent to 80 percent are uni-directional trays. Preferably, at least about 10 percent of all the trays in tray box 26a are bi-directional trays, more preferably at least about 20 percent are bi-directional trays.

As illustrated in FIG. 1, tray box 26a preferably includes an upper set 36 and a lower set 38 of uni-directional trays 32. Upper set 36 of uni-directional trays 32 preferably includes a plurality of length-wise sloped trays 40. Lower set 38 of uni-directional trays 32 preferably includes a plurality of width-wise sloped trays 42. As shown by the arrows in FIGS. 2 and 3, it is preferred for each uni-directional tray 32 to be elongated—with length-wise sloped trays 40 (FIG. 2) being sloped in the direction of tray elongation, while width-wise sloped trays 42 (FIG. 3) are sloped perpendicular to the direction of tray elongation. As illustrated in FIGS. 2 and 3, the directions of slope of length-wise sloped trays 40 and width-wise sloped trays 42 are substantially perpendicular to one another.

As illustrated in FIGS. 1, 2, and 5, vertically adjacent length-wise sloped trays 40a,b are sloped in generally opposite directions so that the reaction medium is forced to flow back and forth over length-wise sloped trays 40 as it progresses downwardly in reactor 20. As illustrated in FIGS. 2 and 5, each length-wise sloped tray 40 includes a substantially flat, substantially rectangular main member 44 and a weir 46. In the embodiment illustrated in FIGS. 1-6, three sides of main member 44 are preferably coupled to and sealed along three of the four sidewalls 27 of the tray box 26a, while a gap 47 (FIGS. 2a,b and 5b) is formed between the fourth side of main member 44 and the remaining sidewall 27 of tray box 26a. Gap 47 provides a passageway though which the reaction medium can fall downwardly onto the next lower length-wise sloped tray 40. Main member 44 is sloped downwardly so that the reaction medium can flow by gravity towards weir 46. The downward slope of main member 44 is preferably in the range of from about 0.5 to about 10 degrees from horizontal, most preferably in the range of from 1 to 4 degrees from horizontal.

Figures 5A, 5B:
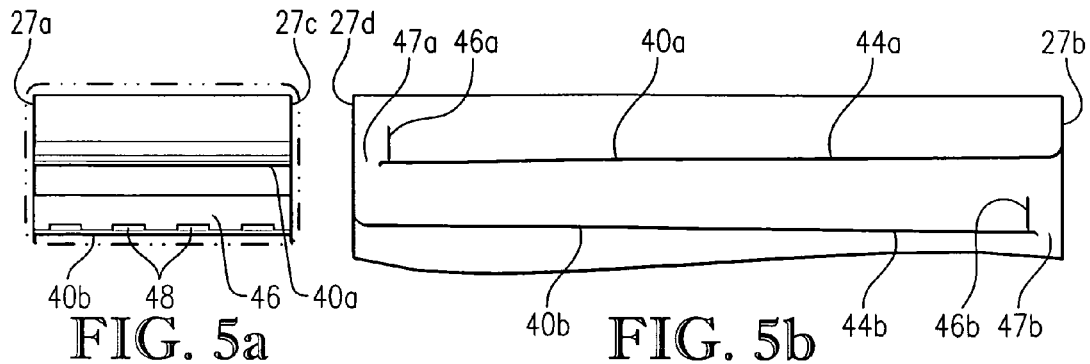

Referring again to FIGS. 2 and 5, main member 44 presents a generally flat, upwardly-facing upper surface. Main member 44 preferably has substantially no openings therein so that all liquid flowing on tray 40 must pass over/through weir 46 in order to leave tray 40. Weir 46 extends upwardly from the upper surface of main member 44 proximate the lowest elevation of main member 44. Preferably, weir 46 is spaced less than about 6 inches from the terminal edge of main member 44, more preferably less than about 3 inches, and most preferably less than 2 inches. Preferably, weir 46 extends all the way along the width of length-wise sloped tray 40, from sidewall 27a to sidewall 27c. Weir 46 helps maintain a substantially uniform sheet of reaction medium on tray 40. Preferably, weir 46 has a height of at least about 2.5 inches. More preferably, the height of weir 46 is in the range of from 3 to 12 inches. As illustrated in FIG. 5a, a plurality of relatively small weir openings 48 are preferably formed near the bottom of weir 46, adjacent main member 44. Weir openings 48 permit a relatively small quantity of reaction medium to flow therethrough during normal operation of reactor 20. During shutdown of reactor 20, weir openings 48 allow substantially all of the reaction medium to be drained off of trays 40, so that a pool of the reaction medium does not remain trapped behind weir 46 when reactor 20 is shut down.

Figures 3A, 3B:
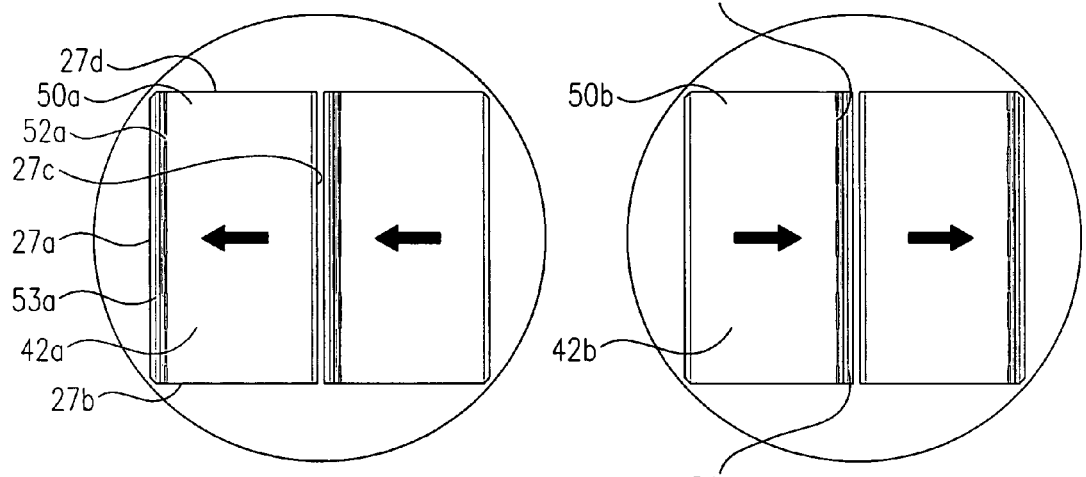

As illustrated in FIGS. 1, 3, and 6, vertically adjacent width-wise sloped trays 42a,b are sloped in generally opposite directions so that a reaction medium is forced to flow back and forth over width-wise sloped trays 42 as it progresses downwardly in reactor 20. As illustrated in FIGS. 3 and 6, each width-wise sloped tray 42 includes a substantially flat, substantially rectangular main member 50 and a weir 52. Three sides of main member 44 are coupled to and sealed along three of the four sidewalls 27 of tray box 26a, while a gap 53 (FIGS. 3a,b and 6a) is formed between the fourth side of main member 50 and the remaining sidewall 27 of tray box 26a. Gap 53 provides a passageway though which the reaction medium can fall downwardly onto the next lower width-wise sloped tray 42. Main member 50 is sloped so that the reaction medium can flow by gravity downwardly towards weir 52. The downward slope of width-wise sloped trays 42 increases downwardly in reactor 20. Preferably, the uppermost one of the width-wise sloped trays 42 has a downward slope in the range of from about 0.5 to about 10 degrees from horizontal, most preferably in the range of from 1 to 4 degrees from horizontal. Preferably, the lowermost one of the width-wise sloped trays 42 has a downward slope in the range of from about 2 to about 20 degrees from horizontal, most preferably in the range of from 4 to 10 degrees from horizontal. Preferably, the downward slope of the lowermost one of the width-wise sloped trays 42 is at least about 1 degree greater than the downward slope of the uppermost one of the width-wise sloped trays 42, more preferably at least about 2 degrees greater than the downward slope of the uppermost one of the width-wise sloped trays 42, and most preferably in the range of from 4 to 10 degrees greater than the downward slope of the uppermost one of the width-wise sloped trays 42.

Figures 6A, 6B:
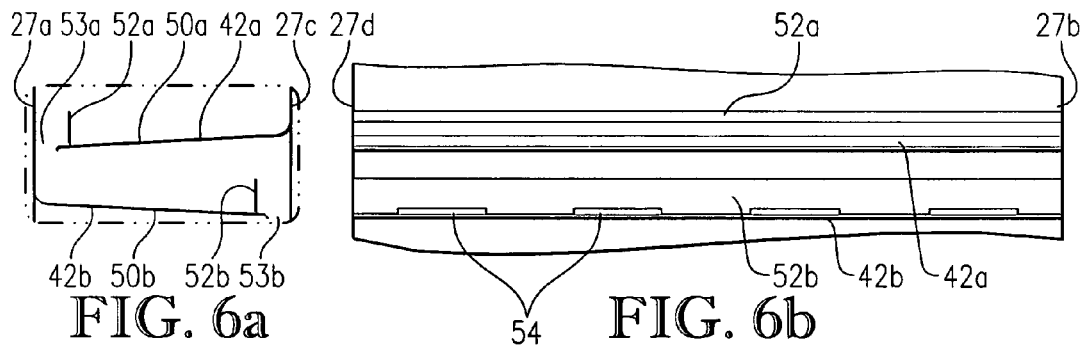

Referring again to FIGS. 3 and 6, main member 50 preferably has substantially no openings therein so that all liquid flowing on tray 42 must pass over/through weir 52 in order to leave tray 42. Main member 50 presents a generally upwardly-facing upper surface. Weir 52 extends upwardly from the upper surface of main member 50 proximate the lowest elevation of main member 50. Preferably, weir 52 is spaced from the terminal edge of main member 50 by a distance of less than about 6 inches, more preferably less than about 3 inches, and most preferably less than 1 inch. Preferably, weir 52 extends all the way between sidewall 27b and sidewall 27d. Weir 52 helps maintain a substantially uniform sheet of reaction medium on tray 42. Preferably, weir 52 has a height of at least about 2.5 inches. More preferably, the height of weir 52 is in the range of from 3 to 12 inches. As illustrated in FIG. 6b, a plurality of relatively small weir openings 54 are preferably formed near the bottom of weir 52, adjacent main member 50. Weir openings 54 permit a relatively small quantity of reaction medium to flow therethrough during normal operation of reactor 20. During shutdown of reactor 20, weir openings 54 allow substantially all of the reaction medium to be drained off of trays 42, so that a pool of the reaction medium does not remain trapped behind weir 52 when reactor 20 is shut down.

In one embodiment of the present invention, at least 5 of the uni-directional trays 32 are equipped with a weir, more preferably at least 10 of the uni-directional trays 32 are equipped with a weir. Preferably, at least 10 percent of all the uni-directional trays 32 in tray box 26a are equipped with a weir, more preferably at least 33 percent of the uni-directional trays 32 are equipped with a weir, and most preferably at least 66 percent of the uni-directional trays 32 are equipped with a weir.

The weir can help provide more residence time in the inventive reactor than in conventional designs, while requiring equivalent or less reactor volume, trays, and/or metal surfaces. Further, the weirs can help provide a thicker sheet of reaction medium on the trays than conventional PET finisher designs. Also, it should be noted that the embodiments described herein advantageously provide thinner sheets of reaction medium falling downwardly from tray to tray and thicker sheets of reaction medium on the trays.

Figures 4A, 4B:
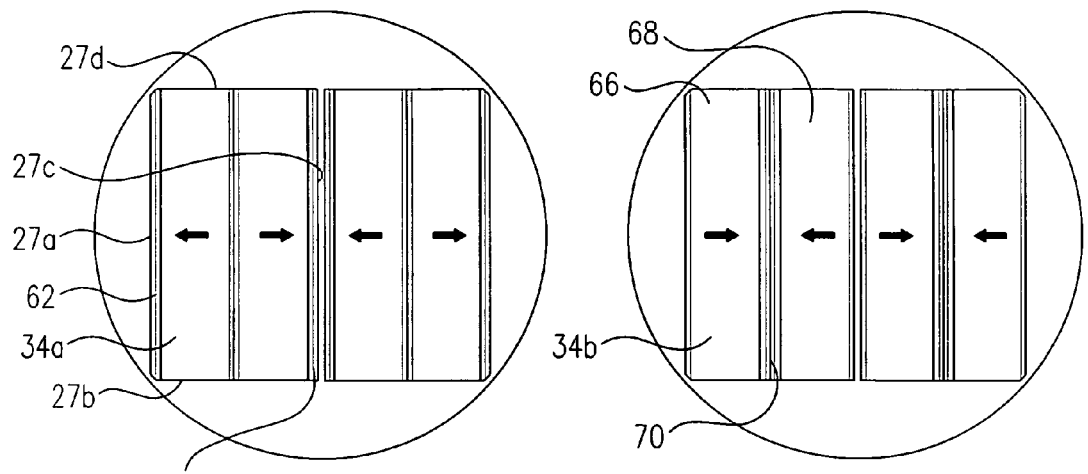
Figures 7A, 7B:
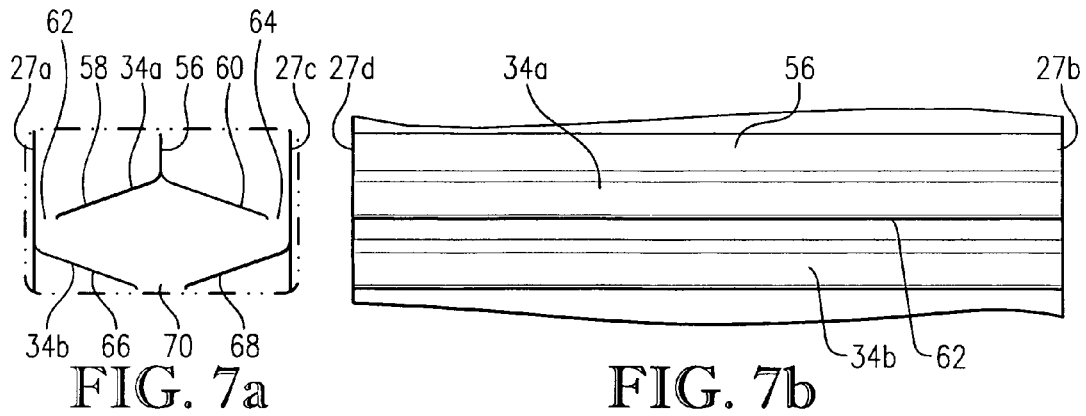

As illustrated in FIGS. 1, 4, and 7, bi-directional trays 34 are coupled to and extend between sidewalls 27b,d of box tray 26a. Bi-directional trays 34 include alternating roof trays 34a and trough trays 34b. As perhaps best illustrated in FIGS. 4a and 7a, each bi-directional roof tray 34a includes an upright divider member 56 and a pair of downwardly sloping roof members 58,60 extending in generally opposite directions from the bottom of divider member 56. Roof members 58,60 diverge from one another as they extend downwardly and outwardly from divider member 56. A first gap 62 is formed between the terminal edge of roof member 58 and sidewall 27a. A second gap 64 is formed between the terminal edge of roof member 60 and sidewall 27c. The reaction medium flows downwardly through gaps 62,64 in order to reach the next lower bi-directional trough tray 34b.

Referring now to FIGS. 4b and 7a, each bi-directional trough tray 34b includes a pair of downwardly sloping trough members 66,68 coupled to and extending inwardly from sidewalls 27a,c of tray box 26a. Trough members 66,68 converge towards one another as they extend downwardly and inwardly from sidewalls 27a,c. A gap 70 is formed between the lower terminal edges of trough members 66,68. Gap 70 is sufficiently large to allow the separate sheets of reaction medium flowing on trough members 66,68 to remain separate as they fall through gap 70 to the next lower roof tray 34a. The separate portions of the reaction medium that flow on trough members 66,68 fall downwardly through gap 70 on opposite sides of the dividing member 56 of the next lower roof tray 34a.

In a preferred embodiment of the present invention, the slope of the bi-directional trays 34 increase downwardly in reactor 20. Preferably, the uppermost one of the bi-directional trays 34 has a downward slope in the range of from about 0.5 to about 10 degrees from horizontal, most preferably in the range of from 1 to 4 degrees from horizontal. Preferably, the lowermost one of the bi-directional trays 42 has a downward slope in the range of from about 5 to about 40 degrees from horizontal, most preferably in the range of from 10 to 25 degrees from horizontal. Preferably, the downward slope of the lowermost one of the bi-directional trays 34 is at least about 2 degrees greater than the downward slope of the uppermost one of the bi-directional trays 34, more preferably at least about 4 degrees greater than the downward slope of the uppermost one of the bi-directional trays 34, and most preferably in the range of from 6 to 20 degrees greater than the downward slope of the uppermost one of the bi-directional trays 34.

Referring now to FIGS. 1 and 8, a transition member 72 is employed to transition the flow of the reaction medium from single sheet flow on uni-directional trays 32 to double sheet flow on bi-directional trays 34. Transition member 74 is coupled to and extends between sidewalls 27b,d of tray box 26a. Transition member 74 includes an upper distribution bin 76 and a lower distribution tray 78. Distribution bin 76 is operable to receive the reaction medium from the lower most uni-directional tray 32 and split the reaction medium into two substantially equal portions. The two equal portions of reaction medium are discharged from the bottom of distribution bin 76 onto separate diverging sections 80a,b of distribution tray 78. In the same manner, subsequent splits in the flow exiting from downstream bi-directional trays is possible using similar distribution boxes. In this manner, multiple bi-directional pathways can be created if required by viscosity, flowrate, and liquid depth targets.

Distribution bin 76 includes a pair of sloping sidewalls 82a,b which converge downwardly towards one another. A divider line 84 is defined at the location where sidewalls 82a,b join one another. A plurality of first openings 86a are defined in sidewall 82a proximate divider line 84. A plurality of second openings 86b are defined in sidewall 82b proximate divider line 84. Preferably, transition member 78 includes a total of at least about 10 openings 86a,b. As best illustrated in FIG. 8b, first and second openings 86a,b are located on opposite sides of divider line 84. Preferably, the cumulative open area defined by first openings 86a is substantially equal to the cumulative open area defined by second openings 86b, so that equal amounts of reaction medium automatically flow through first and second openings 86a,b. First openings 86a are aligned over first section 80a of distribution tray 78, while second openings 86b are aligned over second section 80b of distribution tray 78.

Figure 8A:
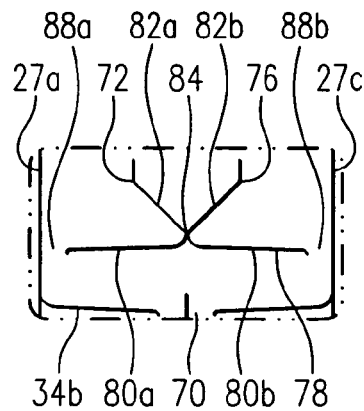
FIG. 8a is an enlarged front view of the transition assembly circumscribed with phantom lines and labeled "8" in FIG. 1.
Figure 8B:
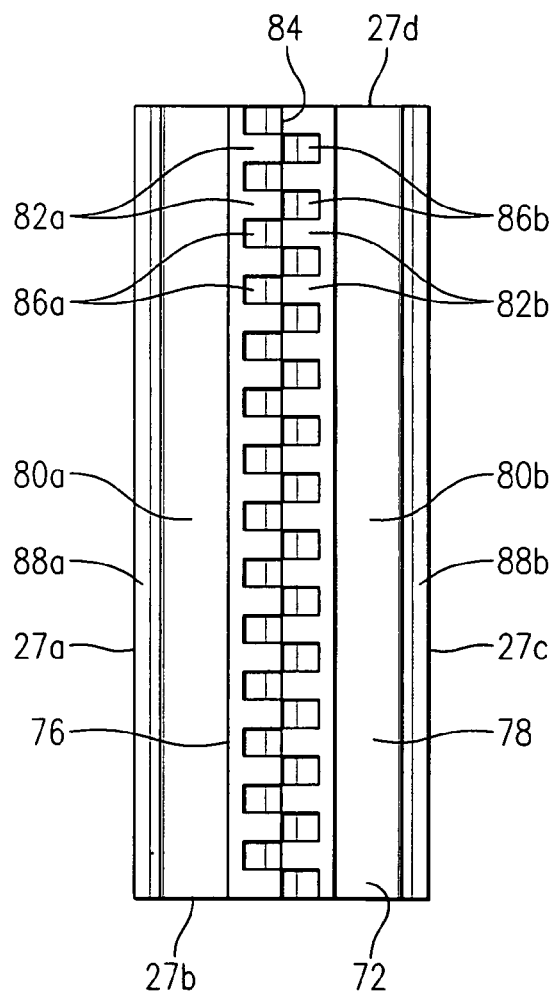

As shown in FIGS. 8a,b, the terminal edges of first and second sloping sections 80a,b, of distribution tray 78 are spaced from sidewalls 27a,c so that gaps 88a,b are formed therebetween. The two substantially equal portions of reaction medium discharged from distribution bin 76 flow on downwardly-sloping diverging sections 80a,b of distribution tray 78 toward gaps 88a,b. The separate portions of the reaction medium then fall off of distribution tray 78, through gaps 88a,b, and onto the uppermost converging bi-directional tray 34b. As mentioned above, the two substantially equal portions of the reaction medium are then kept separate as they flow downwardly over bi-directional trays 34.

Figures 9, 10:
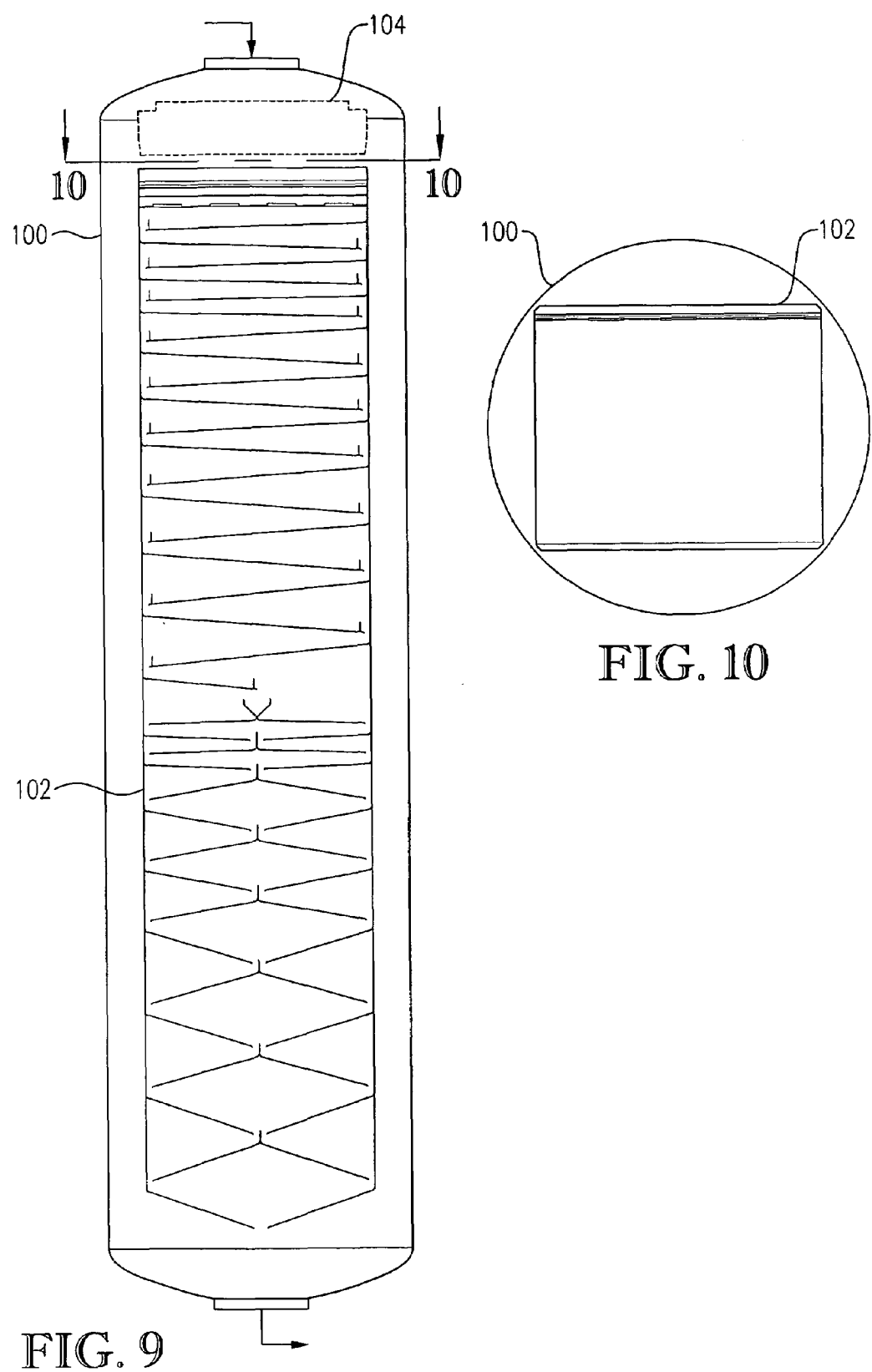
FIG. 9 is a sectional front view of a reactor constructed in accordance with a first alternative embodiment of the present invention, particularly illustrating that the reactor has only a single tray box disposed therein.
FIG. 10 is a sectional top view of the alternative reactor taken along line 10-10 in FIG. 9, particularly illustrating the manner in which the single tray box is positioned in the reactor.

Referring now to FIGS. 9 and 10, a first alternative reactor design is illustrated. Alternative reactor 100 includes only a single tray box 102. This design has the advantage of not needing to split the feed equally among multiple tray boxes. Thus, the construction of distributor 104 is simplified. Also, the total number of trays, distribution of different types of trays, number or weirs, location of weirs, and slope trays in reactor 100 are different than that of reactor 20 (FIGS. 1-8). These differences illustrate that it may be desirable to vary the design of the reactor to meet the particular requirements of the process within which it is implemented. However, all designs disclosed herein are within the ambit of the present invention.

Figures 11, 12, 13:
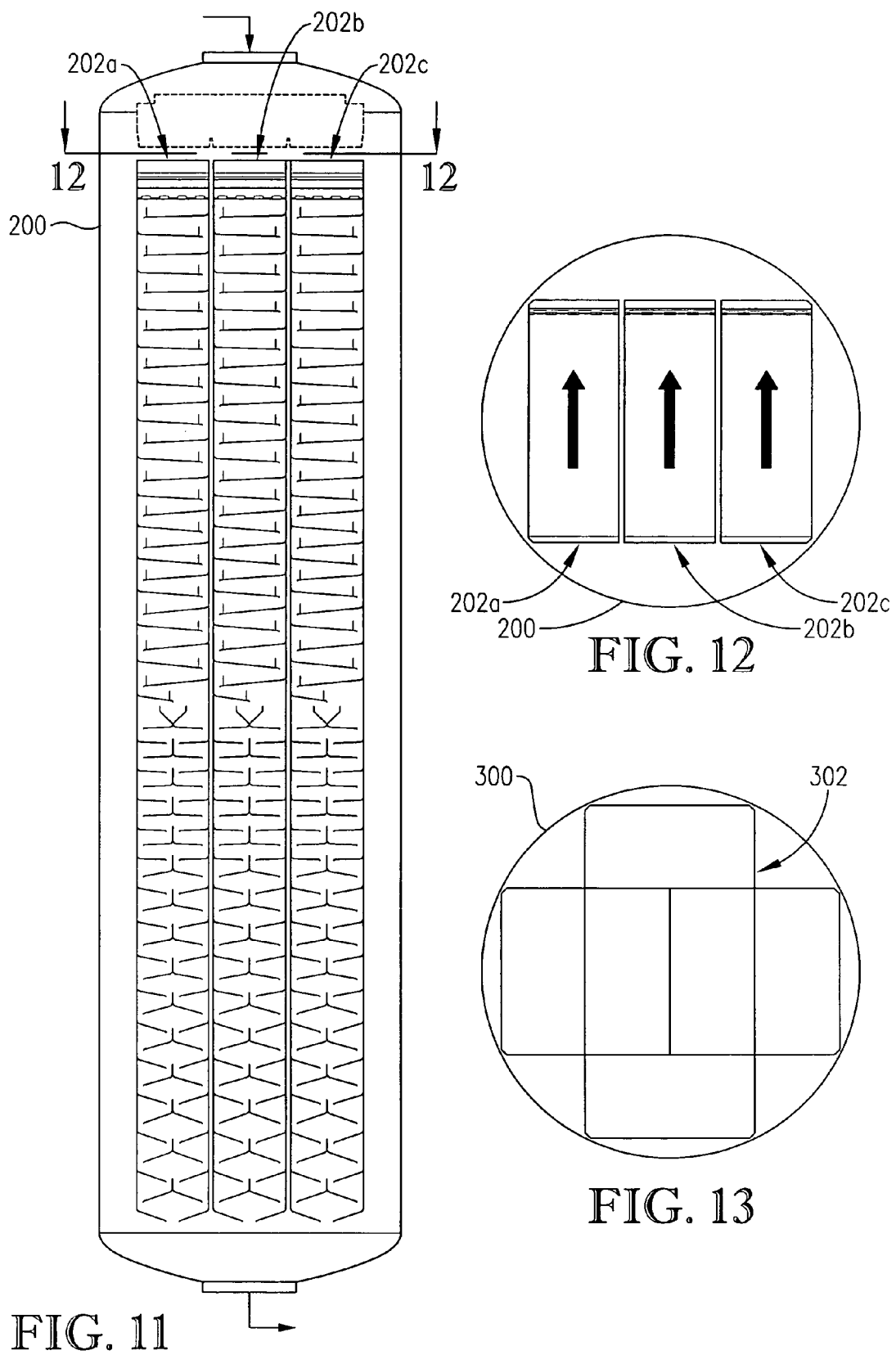
FIG. 11 is a sectional front view of a reactor constructed in accordance with a second alternative embodiment of the present invention, particularly illustrating that the reactor has three tray boxes disposed therein.
FIG. 12 is a sectional top view of the alternative reactor taken along line 12-12 in FIG. 1, particularly illustrating the manner in which the three tray boxes are positioned in the reactor.
FIG. 13 is a sectional top view of a reactor constructed in accordance with a third alternative embodiment of the present invention, particularly illustrating that the reactor has six tray boxes positioned side-by-side in the reactor.

Referring now to FIGS. 11 and 12, a second alternative reactor design is illustrated. Alternative reactor 200 includes three tray boxes 202a,b,c.

Referring now to FIG. 13, a third alternative reactor design is illustrated. Alternative reactor 300 includes six tray boxes 302. This design has the advantage of using more space within the reaction vessel, so the size of the reaction vessel can be reduced.

Figure 14:
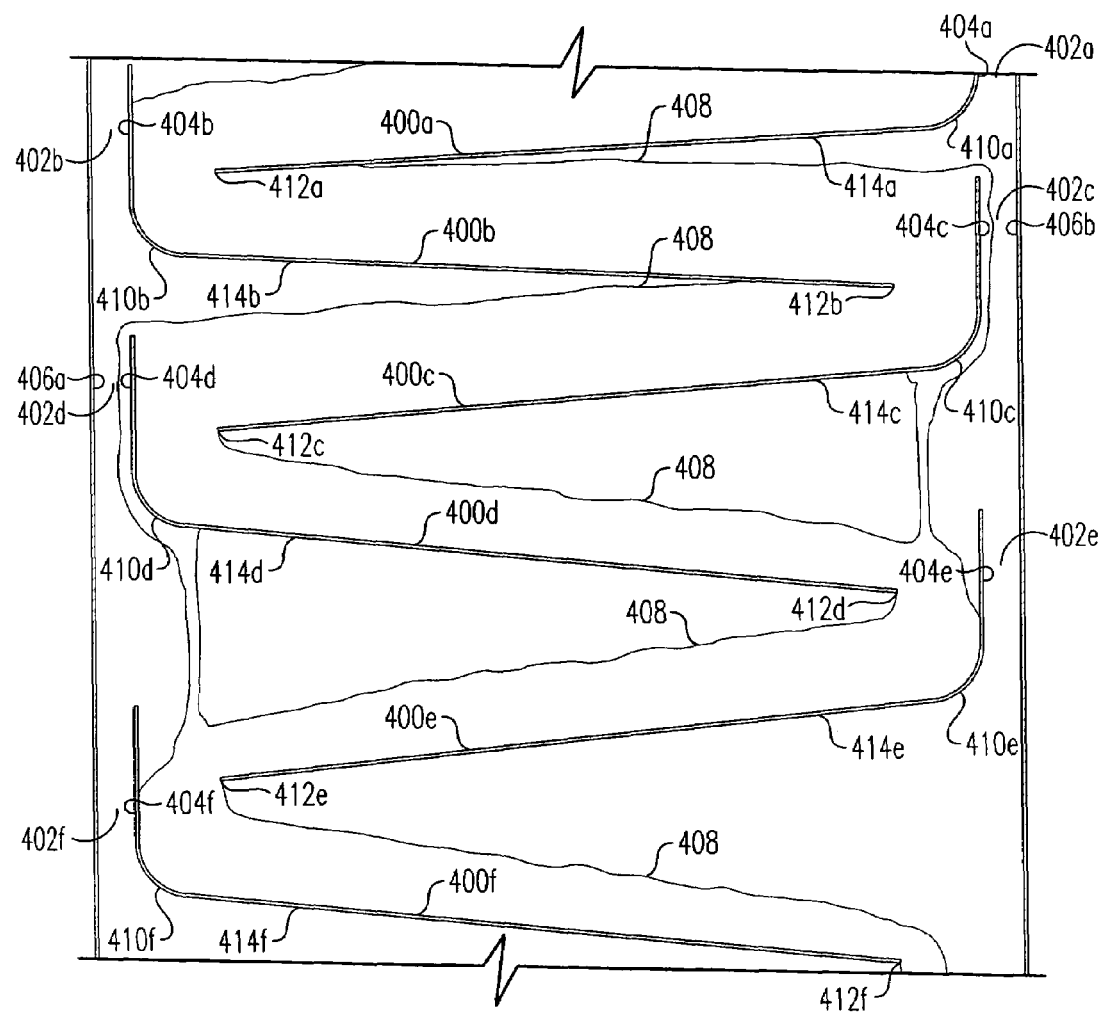
FIG. 14 is a side view of a series of uni-directional trays constructed in accordance with an alternative embodiment of the present invention, particularly illustrating that a gap can be formed at the back of the uni-directional trays to allow a portion of the reaction medium to overflow the back of one tray and fall to the next lower tray.

Referring now to FIG. 14, an alternative uni-directional tray design is illustrated. The uni-directional trays 400 illustrated in FIG. 14 are similar to those illustrated in FIGS. 5 and 6, but are configured to provide a gap 402 between the back 404 of each uni-directional tray 400 and the nearest sidewall 406 of the tray box. It should be understood that sidewall 406 need not be a wall of the tray box with the trays 400 are associated; rather, sidewall 406 can be the wall of another tray box or the wall of the reactor vessel. As illustrated in FIG. 14, this gap 402 between the back 404 of each tray 400 and the nearest sidewall 406 allows a portion of the processed reaction medium 408 to overflow the back 404 of the tray 400 and fall downwardly to the next lower tray 400. In order to provide a sufficiently large opening for passage of the overflowing reaction medium 408, it is preferred for the gap 402 between the back 404 of the trays 400 and the nearest sidewall 406 to have an average width of at least about 1 inch, more preferably in the range of from about 1.5 to about 12 inches, and most preferably in the range of from 2 to 8 inches.

In the embodiment illustrated in FIG. 14, it is preferred for the back 404 of each uni-directional tray 400 to include a rounded lower edge 410 that permits the overflowing reaction medium 408 to "cling" to the upper tray 400 until it is positioned over at least a portion of the next lowest tray 400. Once positioned over the next lowest tray 400, the reaction medium 408 falls from the upper tray 400 to the lower tray 400, where it is recombined with the portion of the reaction medium 408 that flowed over the terminal edge 412 of the upper tray 400 and onto the lower tray 400. In order to allow the overflowing reaction medium to cling to the upper tray 400 until positioned over the lower tray 400, it is preferred for the rounded lower edge 410 of the uni-directional trays 400 to have a minimum radius of curvature of at least 1 inch, more preferably in the range of from about 1.5 to about 12 inches, and most preferably in the range of from 2 to 8 inches.

It should also be noted that the embodiment illustrated in FIG. 14 employs uni-directional trays 400 without weirs. Thus, the terminal edges 412 of the trays 400 illustrated in FIG. 14 are defined by an edge of the substantially flat main member 414 of the trays 400, rather than by the upper edge of a weir. However, it is contemplated that the back-overflow design illustrated in FIG. 14 is also suitable for use with trays having weirs.

The reactors illustrated in FIGS. 1-14 can be employed in a variety of different processes. These reactors are particularly useful in processes where it is advantageous for chemical reactions to take place in relatively thin sheets of a reaction medium. Further, these reactors are designed to accommodate the situation where the viscosity of the reaction medium increases during processing. In a preferred embodiment of the present invention, the dynamic viscosity (measured in poise) of the reaction medium exiting the reactor is at least about 50 percent greater than the dynamic viscosity of the reaction medium entering the reactor, more preferably at least about 250 percent greater than the dynamic viscosity of the reaction medium entering the reactor, and most preferably at least 1,000 percent greater than the dynamic viscosity of the reaction medium entering the reactor. Preferably, the reactor(s) described above are polymerization reactors employed to process a reaction medium undergoing polymerization.

In a particularly preferred process, the reactor is employed in a process for producing polyethylene terephthalate (PET). In such a process, the reaction medium entering the reactor preferably has a degree of polymerization (DP) in the range of from about 20 to about 75, more preferably in the range of from about 35 to about 60, and most preferably in the range of from 40 to 55. As used herein, "degree of polymerization" or "DP" means number-average degree of polymerization, which is defined as the number-average polymer molecular weight divided by the repeat unit molecular weight. As the reaction medium flows downwardly through the reactor, the DP of the reaction medium increases due to polycondensation. Preferably, the DP of the reaction medium exiting the reactor is at least about 25 percent greater than the DP of the reaction medium entering the reactor, more preferably in the range of from about 50 to about 500 percent greater than the DP of the reaction medium entering the reactor, and most preferably in the range of from 80 to 400 percent greater than the DP of the reaction medium entering the reactor. Preferably, the reaction medium exiting the reactor has a DP in the range of from about 75 to about 200, more preferably in the range of from about 90 to about 180, and most preferably in the range of from 105 to 165.

In a preferred embodiment of the present invention, the reaction conditions in the reactor are maintained at a temperature in the range of from about 250 to about 325° C. and a pressure in the range of from about 0.1 to about 4 torr, more preferably at a temperature in the range of from about 270 to about 310° C. and a pressure in the range of from about 0.2 to about 2 torr, and most preferably at a temperature in the range of from 275 to 295° C. and a pressure in the range of from 0.3 to about 1.5 torr. The mean residence time of the reaction medium in the reactor is preferably in the range of from about 0.25 to about 5 hours, most preferably in the range of from 0.5 to 2.5 hours.

The reactor configuration described above with reference to FIGS. 1-14 is preferably operable to maintain an average depth of the reaction medium on the trays of at least about 2.5 inches, most preferably in the range of from 3 to 12 inches.

The inventors note that for all numerical ranges provided herein, the upper and lower ends of the ranges can be independent of one another. For example, a numerical range of 10 to 100 means greater than 10 and/or less than 100. Thus, a range of 10 to 100 provides support for a claim limitation of greater than 10 (without the upper bound), a claim limitation of less than 100 (without the lower bound), as well as the full 10 to 100 range (with both upper and lower bounds).

The invention has been described in detail with particular reference to preferred embodiments thereof, but will be understood that variations and modification can be effected within the spirit and scope of the invention.

That which is claimed is:

1. A reactor comprising: a plurality of vertically-spaced uni-directional sloped trays and a plurality of vertically-spaced bi-directional sloped trays, wherein the slope of said uni-directional trays increases downwardly.

2. The reactor of claim 1 wherein the slope of said bi-directional trays increases downwardly.

3. The reactor of claim 1 wherein at least a portion of said uni-directional trays are located above at least a portion of said bi-directional trays.

4. The reactor of claim 1 wherein all of said uni-directional trays are located above all of said bi-directional trays.

5. The reactor of claim 1 wherein adjacent ones of said uni-directional trays slope in opposite directions.

6. The reactor of claim 1 wherein said bi-directional trays include alternating roof and trough trays, wherein said roof trays include a pair of downwardly-diverging roof members, wherein said trough trays include a pair of downwardly-converging trough members.

7. The reactor of claim 1 wherein said plurality of uni-directional trays includes an upper group of uni-directional trays sloping back and forth in a first direction and a lower group of uni-directional trays sloping back and forth in a second direction, wherein said first and second directions are substantially perpendicular to one another.

8. The reactor of claim 1 wherein at least 10 percent of all the trays in said reactor are uni-directional trays and at least 10 percent of all the trays in said reactor are bi-directional trays.

9. The reactor of claim 1 wherein the slope of said uni-directional trays varies by at least about 2 degrees, wherein the slope of said bi-direction trays varies by at least about 4 degrees.

10. The reactor of claim 1 wherein said uni-directional trays include a substantially flat main member presenting a upwardly-facing sloped surface, said main member having substantially no openings therein.

11. The reactor of claim 10 wherein at least a portion of said uni-directional trays include a weir coupled to said main member and extending upwardly from said upwardly-facing sloped surface.

12. The reactor of claim 11 wherein said weir has a height of at least about 2.5 inches.

13. The reactor of claim 11 wherein at least 10 percent of all of said uni-directional trays are equipped with said weirs, wherein said weirs have a height in the range of from 3 to 12 inches.

14. The reactor of claim 1 wherein said reactor includes a transition member disposed below said uni-directional trays and above said bi-directional trays, wherein said transition member defines a dividing line, a first group of openings located on one side of said dividing line, and a second group of openings located on the other side of said dividing line, wherein the cumulative open area defined by said first group of openings is substantially the same as the cumulative open area defined by said second group of openings.

15. The reactor of claim 14 wherein said transition member includes a pair of downwardly-converging walls that converge towards said dividing line, wherein said first and second groups of openings are located proximate the bottom of said downwardly-converging walls.

16. The reactor of claim 1, wherein at least a portion of said uni-directional trays present a back end and a terminal end, wherein said back and terminal ends are located on generally opposite ends of said uni-directional trays, wherein said tray slopes downwardly from said back end to said terminal end, wherein said reactor defines a back gap located adjacent said back end and a terminal gap located adjacent said terminal end.

17. A reactor for processing a reaction medium, said reactor comprising: a plurality of vertically-spaced sloped trays, wherein at least some of said trays include an upwardly-extending weir over which at least a portion of said reaction medium flows in order to pass to the next tray located immediately therebelow, and wherein the slope of the plurality of vertically-spaced sloped trays increases downwardly.

18. The reactor of claim 17 wherein said weir has a height of at least about 2.5 inches.

19. The reactor of claim 17 wherein said weir has a height in the range of from 3 to 12 inches.

20. The reactor of claim 17 wherein at least 10 percent of all of said trays are equipped with said weir.

21. The reactor of claim 17 wherein said trays include a plurality of uni-directional trays.

22. The reactor of claim 21 wherein adjacent ones of said uni-directional trays slope in opposite directions.

23. The reactor of claim 21 wherein said trays include a plurality of bi-directional trays.

24. The reactor of claim 23 wherein said bi-directional trays include alternating roof and trough trays, wherein said roof trays include a pair of downwardly-diverging roof members, wherein said trough trays include a pair of downwardly-converging trough members.

25. The reactor of claim 23 wherein said bi-directional trays are located below said uni-directional trays.

26. The reactor of claim 23 wherein said reactor includes at least 5 of said uni-directional trays and at least 5 of said bi-directional trays.

27. The reactor of claim 17, wherein at least a portion of said sloped trays present a back end, wherein said trays slope downwardly from said back end to said weir, wherein said reactor defines a back gap located adjacent said back end, wherein at least a portion of said reaction medium flows over said back end and downwardly through said back gap in order to pass to the next tray located immediately therebelow.

* * * * *